Oct. 15, 1946.    C. A. BREEZE    2,409,246
TRACTOR WHEEL ATTACHMENT
Filed Dec. 10, 1943
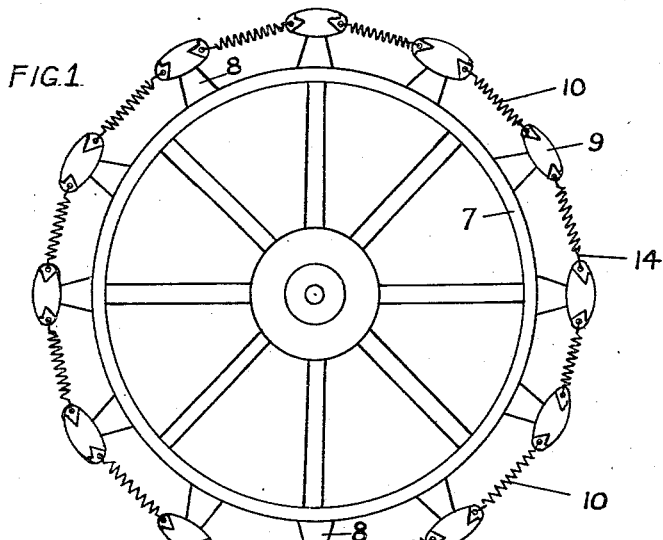
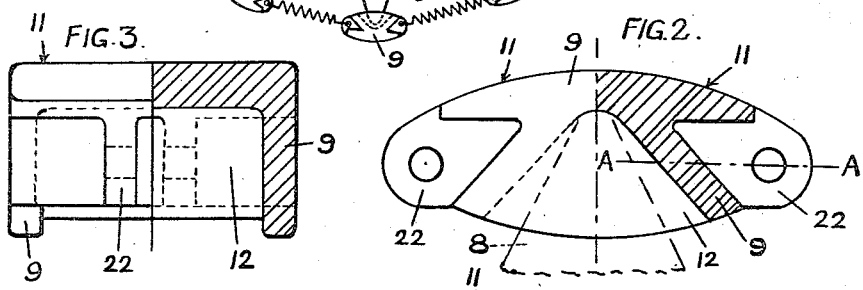
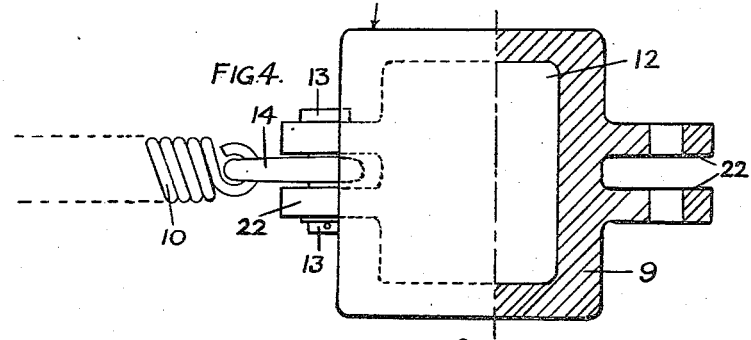
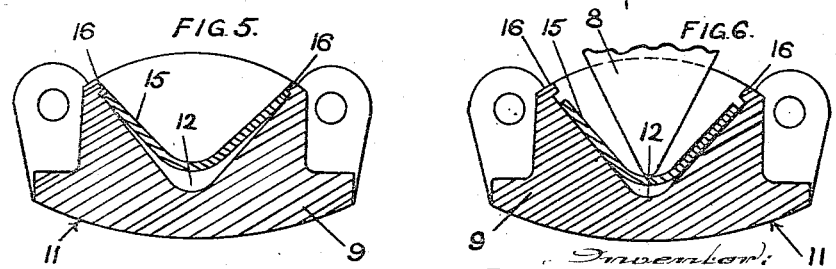

Patented Oct. 15, 1946

2,409,246

UNITED STATES PATENT OFFICE 2,409,246

TRACTOR WHEEL ATTACHMENT

Charles Alfred Breeze, Aberdeen, Scotland

Application December 10, 1943, Serial No. 513,681
In Great Britain December 12, 1942

11 Claims. (Cl. 301—39)

This invention relates to the wheels of agricultural machines and tractors, the wheels of which are provided on their rims with lugs, strakes or projections to obtain a grip on soft ground, and my invention has for its object to provide an attachment for fitting to the wheels for enabling them to be used on hard surfaces, such as public roads, or where damage to the surface is undesirable, by providing a larger bearing surface.

According to my invention the attachment comprises a plurality of shoes flexibly connected together in band formation around the wheel, each shoe being adapted to fit over one of the lugs, strakes or like projections of the wheel rim and preferably rock thereon in the direction of wheel motion, thus enabling the shoes to adapt themselves to inequalities in the road surface and to forces acting on them, while providing bearing surfaces for the wheel.

In carrying out my invention, each shoe may be in the form of a metal or other block provided with a flat or convex or suitably shaped tread surface and provided on its inner side with a notch or recess to receive and position the shoe upon the outer extremity of the lug, strake or like projection on the wheel rim, the said notch or recess being V-shaped or otherwise widening outwards to enable the shoe to rock on the lug, strake or like projection of the wheel rim. Adjacent shoes are connected together by springs, chains, links or other flexible connections to form a band adapted to be fitted around the wheel and serving to hold the shoes in position, while permitting them to rock during rotation of the wheel.

In order that the invention may be more clearly understood, reference is hereinafter made to the accompanying explanatory drawing illustrating examples of tractor wheel attachments according to the invention.

Fig. 1 is a side view of a tractor wheel fitted with my attachment. Fig. 2 is a half elevation and half sectional side view of one of the shoes. Fig. 3 is a view of the shoe half in end view and half in cross-section. Fig. 4 is a view half in plan and half in section on line A—A of Fig. 2.

Figs. 5 and 6 are sectional views of a slightly modified form of shoe having a resilient insert or spring plate, shown in unstressed condition in Fig. 5 and shown in Fig. 6 in the position it assumes under load.

Referring firstly to Fig. 1, this shows a known type of tractor wheel, the rim 7 of which carries a series of lugs, strakes or projections 8 which are adapted to give the wheel a grip on soft ground in known manner. These lugs or like projections are commonly arranged in two annular series on the wheel rim, the lugs of one annular series being staggered in relation to those of the other series, so that they alternate with one another. Only one series is shown in Fig. 1.

The attachment according to my invention comprises a number of shoes 9, equal in number to the number of lugs or projections 8 in the annular series formed on the wheel rim. The shoes 9 are flexibly connected together at distances apart between their centres equal to the distance between the centres of the extremities of adjacent lugs 8, and each shoe 9 is so formed that it can rock upon the extremity of one of the lugs 8. An elastic connection between one or more pairs of shoes 9 enables the attachment to be readily expanded circumferentially around the wheel rim, to enable the shoes to be fitted to or removed from the lugs or projections on the wheel. In Fig. 1 I have shown springs 10 connecting adjacent shoes together to form an elastic band having the shoes attached at regular intervals thereto. Obviously the band could be made with one or more disconnectible joints to enable it to be fitted to or removed from the wheel rim, in which case it may be found unnecessary to provide an elastic connection between the shoes.

Figs. 2, 3 and 4 show details of a convenient form of one of the shoes, which are preferably made of cast iron or steel. The form of shoe shown has a convex tread surface 11 and is formed on its inner side with a divergent recess 12 to receive and rock upon the extremity of the lugs 8 indicated in broken lines in Fig. 2. Lugs 22 on the ends of the shoe are provided for the reception of pins or bolts 13 for securing the ends of the springs 10 to the shoes. Part of one of the springs 10 is shown in Fig. 4 attached to the pin 13 by a link or shackle 14.

The use of springs 10 enables the attachment to adjust itself to wear on the lugs 8 and shoes 9, but chains, links, or other flexible connections may replace one or more of the springs 10 and the connecting chains or other flexible connections may be fitted with means for adjusting them to length to adjust the attachment for wear on the lugs or shoes.

Figs. 5 and 6 illustrate an alternative form of shoe in which the divergent recess 12 is fitted with a somewhat similarly shaped resilient lining or V-shaped spring plate 15 which may be retained in position by lips or projections 16 on the edges of the recess 12, or the spring plate may have slotted holes engaged by pins or projections extending outwards from the face of the recess 12. As shown in Fig. 5, the apex of the spring plate 15 does not bear against the inner extremity of the recess 12 when the spring plate is in an unstressed condition, but when loaded by pressure on the lugs 8 as indicated in Fig. 6, the spring plate 15 is deflected inwards. Thus the spring plate 15 serves to reduce vibration due to any irregularities of the wheel rim or lugs 8 or due to irregularities in the surface over which the wheel is travelling, thereby reducing vibration and road shocks. The spring plate 15 can also be readily renewed when worn.

It will be understood that the design and construction of the shoes may be modified without departing from the scope of the appended claims. For example, the tread surface may be flat or faceted, and may be shod with rubber or other hard wearing material.

I claim:

1. An attachment for encircling circumferentially spaced projections on the rim of a tractor wheel, comprising a plurality of shoes, each shorter in length than the distance between said projections so as to detachably fit over one of said projections on the tractor wheel rim and provide a bearing surface, and elastically extensible and contractible means flexibly connecting said shoes together in band formation.

2. An attachment for encircling circumferentially spaced projections on the rim of a tractor wheel, said attachment comprising a plurality of members, each of said members having a divergent recess on its inner side for receiving one of its projections and being shorter in length than the distance between said projections to permit of rocking movement in the direction of wheel motion when fitted on one of said projections and each of said members presenting an outer tread surface, and means flexibly connecting said members together to encircle the wheel rim.

3. A tractor wheel attachment comprising a plurality of members each presenting an outer tread surface and each provided on its inner side with a divergent recess to receive and position the member on the outer extremity of a projection on the rim of a tractor wheel and to permit said member to rock in the direction of wheel motion, and means flexibly connecting said members together in band formation for encircling the wheel rim.

4. An attachment for encircling circumferentially spaced projections on the rim of a tractor wheel, comprising a plurality of tread members, shorter in length than the distance between said projections and each removably fitted to one of the said projections, and means flexibly connecting said members together in band formation, said means including an elastic connection between a pair of adjacent tread members.

5. An attachment for encircling circumferentially spaced projections on the rim of a tractor wheel, comprising a plurality of tread members, shorter in length than the distance between said projections and each removably fitted to one of the said projections, and means flexibly connecting said members together in band formation, said means comprising elastic connections between adjacent tread members.

6. An attachment for encircling circumferentially spaced projections on the rim of a tractor wheel, comprising a plurality of tread members, shorter in length than the distance between said projections and each removably fitted to one of the said projections, and means flexibly connecting said members together in band formation, said means comprising springs connecting adjacent tread members.

7. A tractor wheel attachment comprising a plurality of tread members, each presenting an outer tread surface and each having a recess on its inner side, a resilient element in said recess, said element being adapted to resiliently fit over one of the projections on the rim of a tractor wheel, and means flexibly connecting said members together.

8. A tractor wheel attachment comprising a plurality of tread members, each presenting an outer tread surface and each having a divergent recess on its inner side, a resilient V-shaped element in said recess, said element being adapted to resiliently fit over one of the projections on the rim of a tractor wheel, and means flexibly connecting said members together.

9. A detachable shoe for a tractor wheel rim projection, comprising a member presenting an outer arcuate tread surface and an inner V-shaped recess, and lugs at the ends of said member for attachment to means connecting said shoe to adjacent shoes.

10. A detachable shoe for a tractor wheel rim projection, comprising a member presenting an outer arcuate tread surface and an inner V-shaped recess, a resilient V-shaped metal plate fitted in said recess, means for retaining said plate in said recess in unstressed condition and for permitting said plate to be deflected inwards and resiliently seated in said recess, when stressed by pressure on said plate, and means for enabling said member to be connected to adjacent shoes.

11. In combination with a tractor wheel having projections extending in annular series radially at intervals from the wheel rim, said projections terminating in reduced outer extremities, means detachably encircling said wheel rim and projections, said means comprising a plurality of tread members, one for each wheel rim projection, each of said members having a recess rockably and removably fitted upon the outer extremity of one of said projections, and means flexibly connecting said members together in band formation to hold them in engagement with the wheel rim projections, while permitting said members to individually rock in the direction of wheel motion.

CHARLES ALFRED BREEZE.